United States Patent
Leone et al.

(10) Patent No.: US 8,365,528 B2
(45) Date of Patent: Feb. 5, 2013

(54) ENGINE VALVE DURATION CONTROL FOR IMPROVED SCAVENGING

(75) Inventors: Thomas G. Leone, Ypsilanti, MI (US); Eric Warren Curtis, Milan, MI (US); James Leiby, Dryden, MI (US); Wen Dai, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 646 days.

(21) Appl. No.: 12/349,427

(22) Filed: Jan. 6, 2009

(65) Prior Publication Data

US 2010/0170460 A1 Jul. 8, 2010

(51) Int. Cl.
*F02B 33/44* (2006.01)
*F01L 1/34* (2006.01)

(52) U.S. Cl. ............... 60/605.1; 123/90.15; 123/90.16; 123/90.17

(58) Field of Classification Search ............ 60/605.1; 123/90.15, 90.16, 90.17
See application file for complete search history.

(56) References Cited

U.S. PATENT DOCUMENTS

| 5,022,357 | A | 6/1991 | Kawamura | |
|---|---|---|---|---|
| 5,421,296 | A | 6/1995 | Hitomi et al. | |
| 6,343,585 | B1 | 2/2002 | Fujieda et al. | |
| 6,705,259 | B1 * | 3/2004 | Sellnau et al. | 123/90.16 |
| 7,124,723 | B2 * | 10/2006 | Yokoyama et al. | 123/90.39 |
| 7,308,872 | B2 * | 12/2007 | Sellnau et al. | 123/90.16 |
| 2004/0237917 | A1 * | 12/2004 | Yasui et al. | 123/90.15 |
| 2007/0219674 | A1 * | 9/2007 | Leone | 701/1 |

FOREIGN PATENT DOCUMENTS

WO 2007/034308 3/2007

OTHER PUBLICATIONS

Grigo, M. et al., *Der neue 2,0-I-TFSI-Motor mit Audi valveaft system*, Sonderausgabe von ATZ und MTZ, Jun. 2008, pp. 30-34.

* cited by examiner

*Primary Examiner* — Quyen Leung
*Assistant Examiner* — Michael Andrews
(74) *Attorney, Agent, or Firm* — Julia Voutyras; Alleman Hall McCoy Russell & Tuttle LLP

(57) ABSTRACT

Systems and methods for controlling air flow in an engine including a turbocharger are provided. One example method includes adjusting valve operation for a turbocharged engine. The method may improve scavenging and reduce exhaust blow down interference.

7 Claims, 7 Drawing Sheets

ENGINE VALVE DURATION CONTROL FOR IMPROVED SCAVENGING

FIELD

The present application relates to methods for controlling air flow in an engine with variable valve timing.

BACKGROUND AND SUMMARY

A 4-cylinder turbocharged engine may use short exhaust cam durations in order to reduce exhaust blowdowns of one cylinder from entering another cylinder during valve overlap at low to mid speeds. Such cylinder-to-cylinder interference is especially a problem on engines which use high valve overlap to achieve scavenging at low RPM high load (typically direct injection engines). Then, at high speeds, a longer exhaust cam duration may be used to increase peak power output. Such an approach is described in Grigo, Wurms, Budack, Helbig, Lange and Trost, *Der neue 2,0-I-TFSI-Motor mit Audi valvelift system*, Sonderausgabe von ATZ und MTZ, June 2008, pp. 30-34.

However, the inventors herein have recognized various issues with the above approach. In particular, the short cam durations may limit valve-timing-related fuel economy gains at part (partial) load. For example, the inventors herein have found that achieving optimum fuel economy benefits at part load may result in much longer cam durations, for example as much as 20 to 40 crankshaft degrees longer for intake and exhaust cam durations. However, as noted above, such longer durations may lead to still other problems of exhaust gas blowdown issues.

As such, in one approach, the above apparently conflicting issues may be addressed by using selective exhaust valve timing adjustments, particularly at part load conditions. For example, in one approach, a method for controlling an engine includes during a first operating range, operating the engine with a first exhaust valve duration at a first exhaust valve timing, during a second operating range, operating the engine with a second exhaust valve duration at a second timing, and during a third operating range, operating the engine with the first exhaust valve duration at a third timing, where engine load of the second operating range is higher than engine load of the first operating range, which in turn is higher than engine load of the third operating range, and where the first exhaust valve duration is longer than the second exhaust valve duration, and where the first timing is retarded to a greater extent than either of the second and third timings.

In this way, it is possible to utilize shorter exhaust valve durations at low engine speed, high load conditions to reduce exhaust blowdown interference and give increased scavenging and torque. Further, longer exhaust valve durations at part load are utilized to give improved valve-timing-related benefits and fuel efficiency. Moreover, operating exhaust valves with a longer opening duration and with retarded timings at partial engine load may increase fuel efficiency and emissions over a range of engine speeds.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE FIGURES

Systems and methods for controlling air flow in an engine are described below. It should be noted the engine may be a multi-cylinder engine, for example an inline four (I4) engine including a turbocharger, or a "V" eight cylinder (V8) twin turbocharged engine. Further, example engines may use different engine cycles, compression ignition, and/or alternate fuels. As one nonlimiting example, a four stroke, spark ignition, gasoline internal combustion engine is referred to throughout the disclosure herein.

In a conventional solution to exhaust blowdown inference in an engine, a twin scroll turbocharger is used which keeps exhaust runners, from different cylinders or groups of cylinders, separate up to a turbine in the turbocharger. However, this solution requires premium materials and/or additional enrichment of exhaust gases for temperature control to prevent durability problems (e.g., exposing hot exhaust gas to both sides of a turbine housing flange). Further, a twin scroll turbocharger may suffer from higher cost and/or degraded engine efficiency at high speeds and loads due to increased enrichment. It should be noted that the methods, systems and devices described herein may allow an engine to achieve excellent low engine speed torque and optimum part load fuel economy with a variable camshaft timing system, while not necessitating the use of a twin scroll turbocharger, although one may be used if desired.

Figure 1:
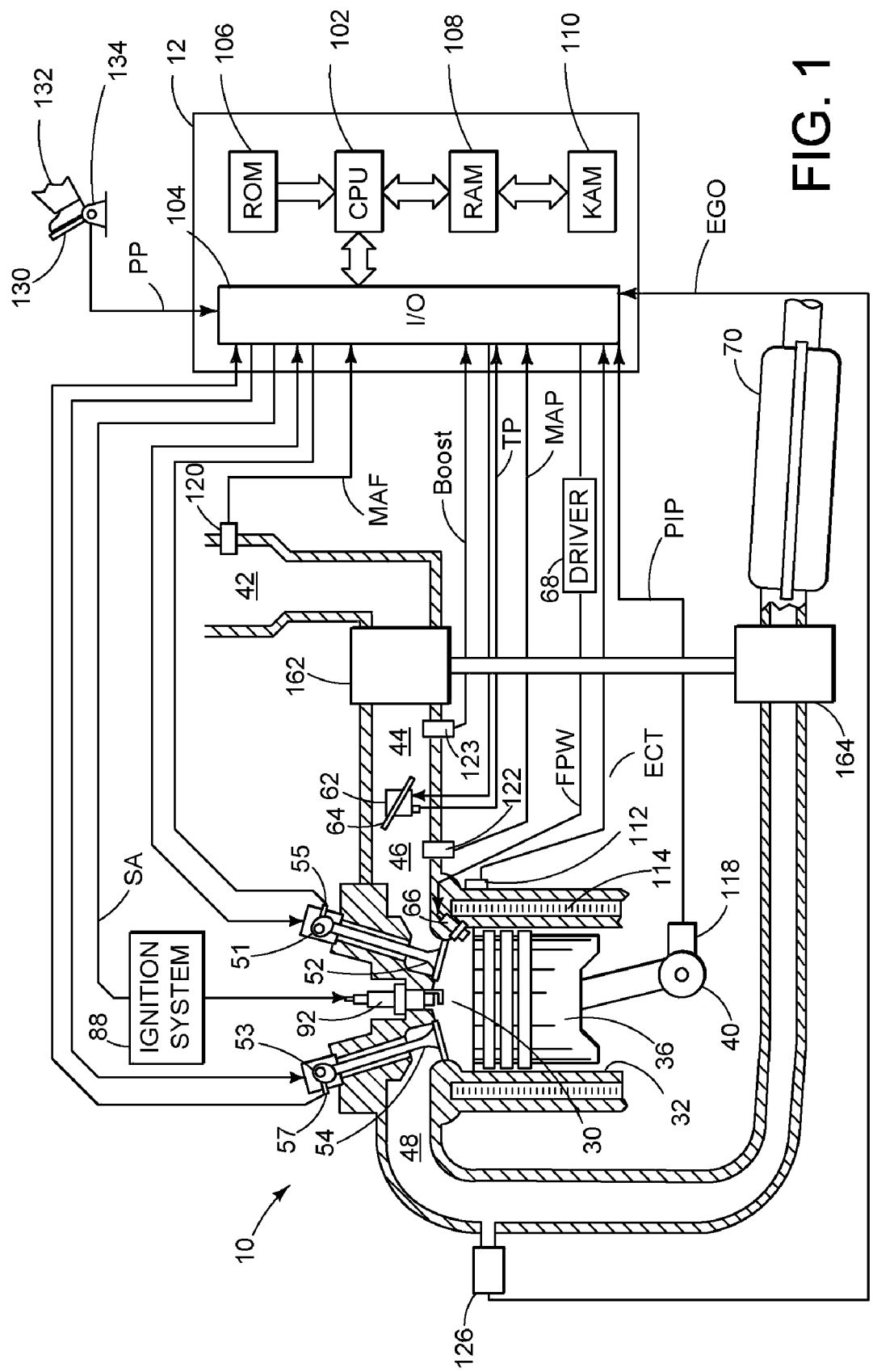
FIG. 1 shows an example engine including systems for controlling air flow in the engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 46 via intake passage 42 and may exhaust combustion gases via exhaust passage 48. Intake manifold 46 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 46 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold absolute pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and manifold absolute pressure signal (MAP) from sensor 122. Engine speed signal (RPM) may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During some conditions, the MAP sensor can give an indication of engine torque. Further, this sensor, along with the detected engine speed and other signals, can provide an estimate of charge (including air) inducted into the cylinder. In one example, sensor 118, which is also used as an engine speed sensor, may produce a predetermined number of equally spaced pulses every revolution of the crankshaft.

Engine 10 may further include a compression device such as a turbocharger or supercharger including at least a compressor 162 arranged along compressor passage 44, which may include a boost sensor 123 for measuring air pressure. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Further, in the disclosed embodiments, an exhaust gas recirculation (EGR) system (not shown) may route a desired portion of exhaust gas from exhaust passage 48 to boost passage 44 and/or intake passage 42 via an EGR passage. The amount of EGR provided to boost passage 44 and/or intake passage 42 may be varied by controller 12 via an EGR valve. Further, an EGR sensor may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing.

As described above, FIG. 1 shows only one cylinder of a multi-cylinder engine, and each cylinder may similarly include its own set of intake/exhaust valves, fuel injector, spark plug, etc. However, some or all of the cylinders may share some components such as camshafts for controlling valve operation. In this manner, a camshaft may be used to control valve operation for two or more cylinders.

Figure 2:
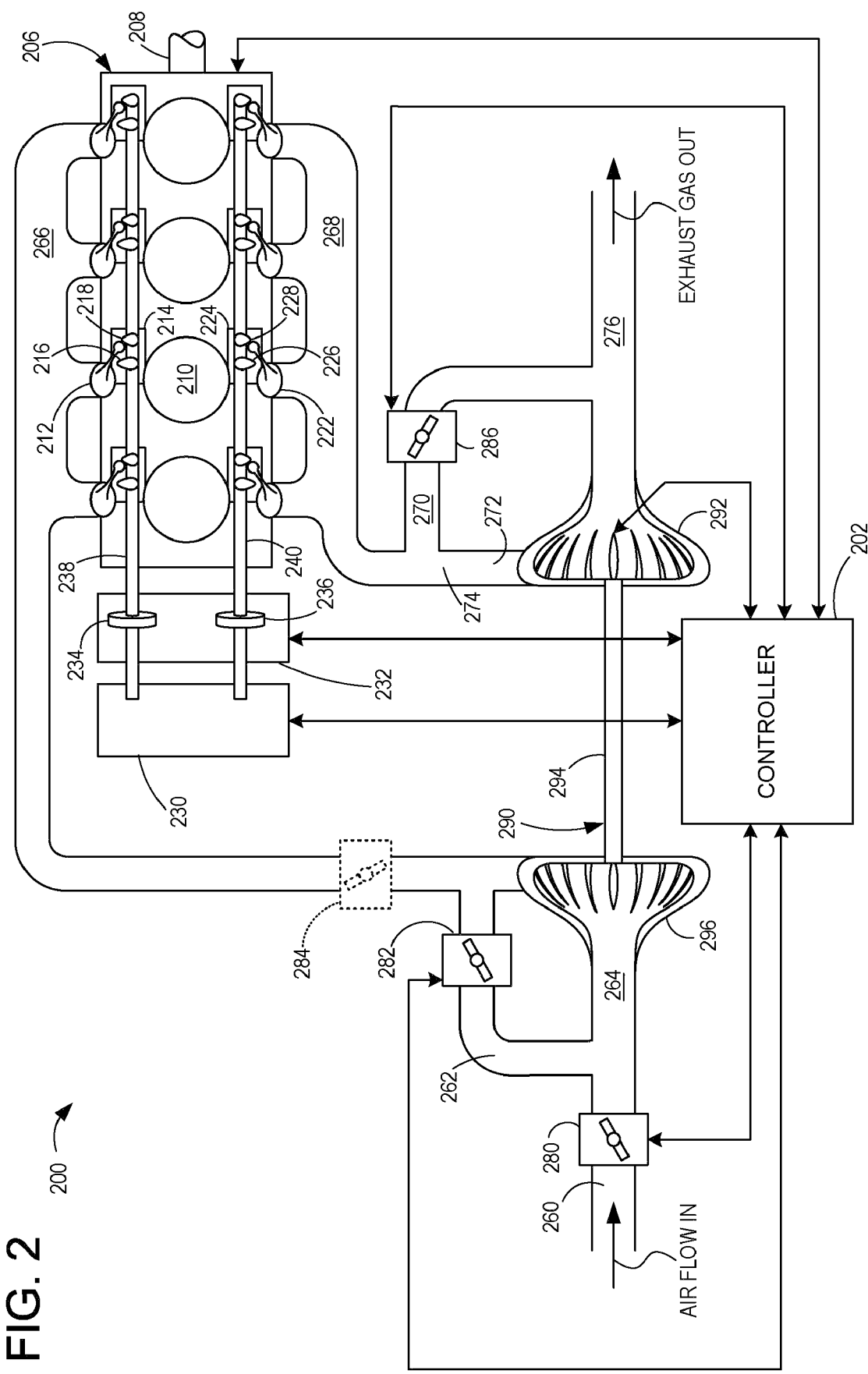
FIG. 2 shows an example engine including a turbocharger and cam profile switching system.

FIG. 2 shows an example embodiment of an engine 200, which may be engine 10, including a controller 202, a variable cam timing (VCT) system 232, a cam profile switching (CPS) system 230, a turbocharger 290 and an engine block 206 with a plurality of cylinders 210. Engine 200 may be one example of engine 10 described above. Engine 200 is shown having an intake manifold 266 configured to supply intake air and/or fuel to the cylinders 210 and an exhaust manifold 268 configured to exhaust the combustion products from the cylinders 210. Ambient air flow can enter the intake system through intake air passage 260, wherein the flow rate of the intake air can be controlled at least in part by main throttle 280. Accordingly, throttle position may be utilized as an engine operating parameter for controlling air flow in the engine.

The turbocharger 290, arranged downstream of main throttle 280, includes a compressor 296, which may be coupled to a turbine 292 by shaft 294 thereby powering the compressor. The coupled turbine 292 and compressor 296 of the turbocharger 290 may rotate at a speed which may increase or decrease with operation of the turbocharger. The turbocharger speed may be an engine operating parameter for controlling boost to the cylinders 210. Compressor 296 is further shown arranged in compressor passage 264. Parallel to the compressor passage 264 is bypass passage 262 and compressor bypass throttle 282. Thus, the amount of intake air bypassing the compressor can be controlled by adjusting the compressor bypass throttle 282. Further, in some embodiments, compressor bypass throttle 282 may also function as a surge valve configured to allow air to flow around the compressor when the compressor causes an undesired restriction of the intake air, such as may occur at higher engine loads.

The compressor passage 264 and compressor bypass passage 262 are further shown recombining into intake manifold 266. Air compressed in the compressor 296 may communicate fluidly with one or more of the cylinders 210 via intake manifold 266. The turbocharger 290 may be configured to increase a mass of air entering at least one of the cylinders 210. In this way, the turbocharger 290 may control, at least in part, an amount of air flow in the engine 200. In some embodiments, a throttle 284 may be configured between the compressor and the engine to control the intake air, either instead of throttle 280 or in addition to throttle 280. Air and exhaust flow in and out of the cylinders 210 may be controlled with cylinder intake valves 212 and exhaust valves 222, discussed in more detail below.

Exhaust manifold 268 is shown fluidly communicating with turbine passage 272 via exhaust gas inlet 274 to enable exhaust gases to flow to turbine 292. Turbine passage 272 may be a single exhaust passage for an entire path that exhaust air may take from an exhaust gas inlet, to the turbine 292. The turbine passage 272 enables a single mixed exhaust gas to enter the turbine 292 from the exhaust manifold 268. In other examples, the turbocharger may include more than one turbine passage from the exhaust gas inlet to the turbine (i.e., the turbocharger may be a twin scroll turbocharger). In such examples additional fuel enrichment may be needed for exhaust temperature control and premium materials may be needed in turbocharger elements and components (for example a turbine housing flange). In examples with a single turbine passage (such as that shown in FIG. 2) additional fuel enrichment and premium materials may not be needed. Further, in some embodiments, turbine 292 may be a variable geometry turbine. In parallel with the turbine passage is turbine bypass passage 270 and waste gate 286. The amount of exhaust gas bypassing the turbine may be controlled by adjusting waste gate 286. Finally, turbine passage 272 and turbine bypass passage 270 are shown recombining to form exhaust passage 276 prior to exhausting to ambient.

In some embodiments, the intake and/or exhaust system may further include one or more sensors configured to measure temperature and pressure at various locations. For example, an ambient air temperature sensor and pressure sensor may be arranged near the entrance of intake passage 260. Likewise, sensors may be arranged along the intake passage before and/or after the compressor, and/or within the intake manifold near the entrance to the combustion cylinder(s), among other locations. Each of these sensors may be configured to communicate via signal lines with controller 202. In this manner, feedback control of the temperature and pressure of the intake air and exhaust air may be maintained by the various control mechanisms described herein.

Continuing with FIG. 2, engine block 206 includes crankshaft 208 and cylinders 210. Cylinders 210 may each include a spark plug and a fuel injector for delivering fuel directly to the combustion chamber, as described above in FIG. 1. However, in alternate embodiments, each cylinder 210 may not include a spark plug and/or direct fuel injector. Cylinders 210 may each be serviced by one or more valves. In the present example, cylinders 210 each include intake valves 212 and exhaust valves 222.

Intake valves 212 include a first intake valve, actuatable between an open position allowing intake air into a first cylinder of the cylinders 210 and a closed position substantially blocking intake air from the first cylinder. Further, FIG. 2 shows how intake valves 212 may be actuated by a common intake camshaft 238. Intake camshaft 238 may be included in intake valve actuation systems 214. Intake camshaft 238 includes at least first intake cams 216 and second intake cams 218. In the present example, first intake cams 216 have a first cam lobe profile for opening the intake valves 212 for a first intake duration. The first intake duration may be a long intake duration, for example 248 crankshaft degrees. Further, in the present example, second intake cams 218 have a second cam lobe profile for opening the intake valve for a second intake duration. The second intake duration may a short intake duration (shorter than the long intake duration), for example 228 crankshaft degrees.

Exhaust valves 222 include a first exhaust valve, actuatable between an open position allowing exhaust gas out of the first cylinder of the cylinders 210 and a closed position substantially retaining gas within the first cylinder. Further, FIG. 2 shows how exhaust valves 222 may be actuated by a common exhaust camshaft 240. Exhaust camshaft 240 may be included in exhaust valve actuation systems 224. Exhaust camshaft 240 includes at least first exhaust cams 226 and second exhaust cams 228. In the present example, first exhaust cams 226 have a first cam lobe profile for opening the exhaust valves 222 for a first exhaust duration. The first exhaust duration may be a long exhaust duration, for example 263 crankshaft degrees. Further, in the present example, second exhaust cams 228 have a second cam lobe profile for opening the exhaust valve for a second exhaust duration. The second exhaust duration may be a short exhaust duration (shorter than the long exhaust duration), for example 220 crankshaft degrees.

Intake valve actuation systems 214 and exhaust valve actuation systems 224 may further include push rods, rocker arms, tappets, etc. Such devices and features may control actuation of the intake valves 212 and the exhaust valves 222 by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 210 may each have more than one exhaust valve and/or intake valve. In still other examples, exhaust valves 222 and intake valves 212 may be actuated by a common camshaft. However, in an alternate embodiment, at least one of the intake valves 212 and/or exhaust valves 222 may be actuated by its own independent camshaft or other device.

Engine 200 may include variable valve timing systems, for example CPS system 230, and variable cam timing VCT system 232. A variable valve timing system may be configured to open a first valve for a first duration during a first operating mode. The first operating mode may occur at an engine load below a part engine load threshold. Further, the variable valve timing system may be configured to open the first valve for a second duration, shorter than the first duration, during a second operating mode. The second operating mode may occur at an engine load above an engine load threshold and an engine speed below an engine speed threshold (e.g., during low to mid engine speeds). In some examples, the engine load threshold of the second operating mode may be the same as the part engine load threshold of the first operating mode. In other examples, the engine load threshold of the second operating mode is not the same as the part engine load threshold of the first operating mode.

CPS system 230 may be configured to translate intake camshaft 238 longitudinally, thereby causing operation of intake valves 212 to vary between first intake cams 216 and second intake cams 218. Further, CPS system 230 may be configured to translate exhaust camshaft 240 longitudinally, thereby causing operation of exhaust valves 222 to vary between first exhaust cams 226 and second exhaust cams 228. In this way, CPS system 230 may switch between a first cam, for opening a valve for a first duration, and a second cam, for opening the valve for a second duration.

Further, the CPS system 230 may be configured to actuate the intake valves with the first intake cams and actuate the exhaust valves with the first exhaust cams during a first operating mode that occurs at an engine load below a part engine load threshold. Further still, the CPS system 230 may be configured to actuate the intake valves with the second intake cams and actuate the exhaust valves with the second exhaust cams during a second operating mode that occurs at an engine load above an engine load threshold and at an engine speed below an engine speed threshold.

Also, the CPS system may be operated in response to engine operating parameters and conditions. For example, transient airflow differences, such as between the intake manifold 266 and the cylinders 210 may lead to selecting a particular speed or speed range for the CPS system to switch a camshaft between first cams and second cams. Further, the CPS system 230 may operate at least one of an exhaust valve, and an intake valve of a first cylinder and a second valve of a second cylinder with a short cam duration to inhibit an exhaust blowdown of the first cylinder from entering the second cylinder.

The configuration of cams described above may be used to provide control of the amount of air supplied to, and exhausted from, the cylinders 210. However, other configurations may be used to enable CPS system 230 to switch valve control between two or more cams. For example, a switchable tappet or rocker arm may be used for varying valve control between two or more cams.

Engine 200 may further include VCT system 232. VCT system 232 may be a twin independent variable camshaft timing system, for changing intake valve timing and exhaust valve timing independently of each other. VCT system 232 includes intake camshaft phaser 234 and exhaust camshaft phaser 236 for changing valve timing. VCT system 232 may be configured to advance or retard valve timing by advancing or retarding cam timing (an example engine operating parameter) and may be controlled via signal lines by controller 202. VCT system 232 may be configured to vary the timing of valve opening and closing events by varying the relationship between the crankshaft position and the camshaft position. For example, VCT system 232 may be configured to rotate intake camshaft 238 and/or exhaust camshaft 240 independently of the crankshaft to cause the valve timing to be advanced or retarded. In some embodiments, VCT system 232 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. Signal lines can send control signals to and receive a cam timing and/or cam selection measurement from CPS system 230 and VCT system 232.

As described above, FIG. 2 shows a non-limiting example of an internal combustion engine and associated intake and exhaust systems. It should be understood that in some embodiments, the engine may have more or less combustion cylinders, control valves, throttles, and compression devices, among others. Example engines may have cylinders arranged in a "V" configuration. Further, a first camshaft may control the intake valves for a first group or bank of cylinders and a second camshaft may control the intake valves for a second group of cylinders. In this manner, a single CPS system and/or VCT system may be used to control valve operation of a group of cylinders, or separate CPS and/or VCT systems may be used. Further still, in some embodiments, the engine 200 may include a battery and a turbo driver, controlled by controller 202, for electronically powering the compressor 296. Further still, in some embodiments, turbocharger 290 may alternatively be a supercharger or other compression device.

Figure 3:
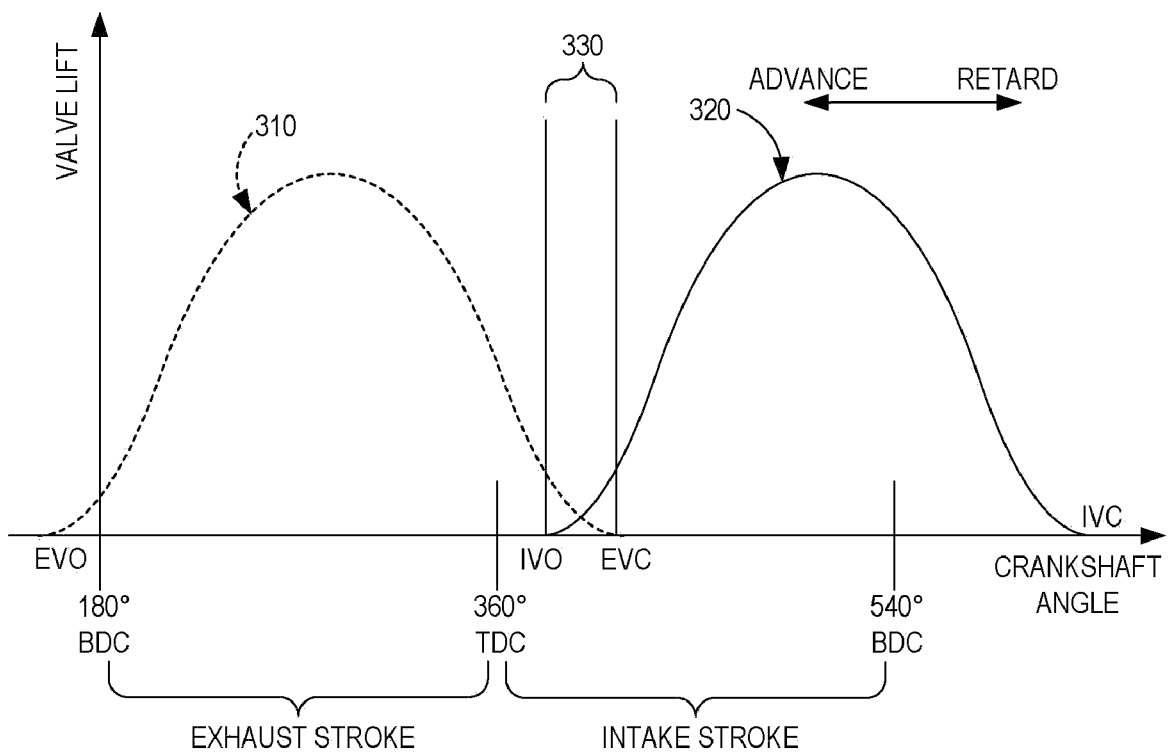
FIG. 3 is a graph showing example valve timings, lifts, and durations during a first operating mode.
Figure 4:
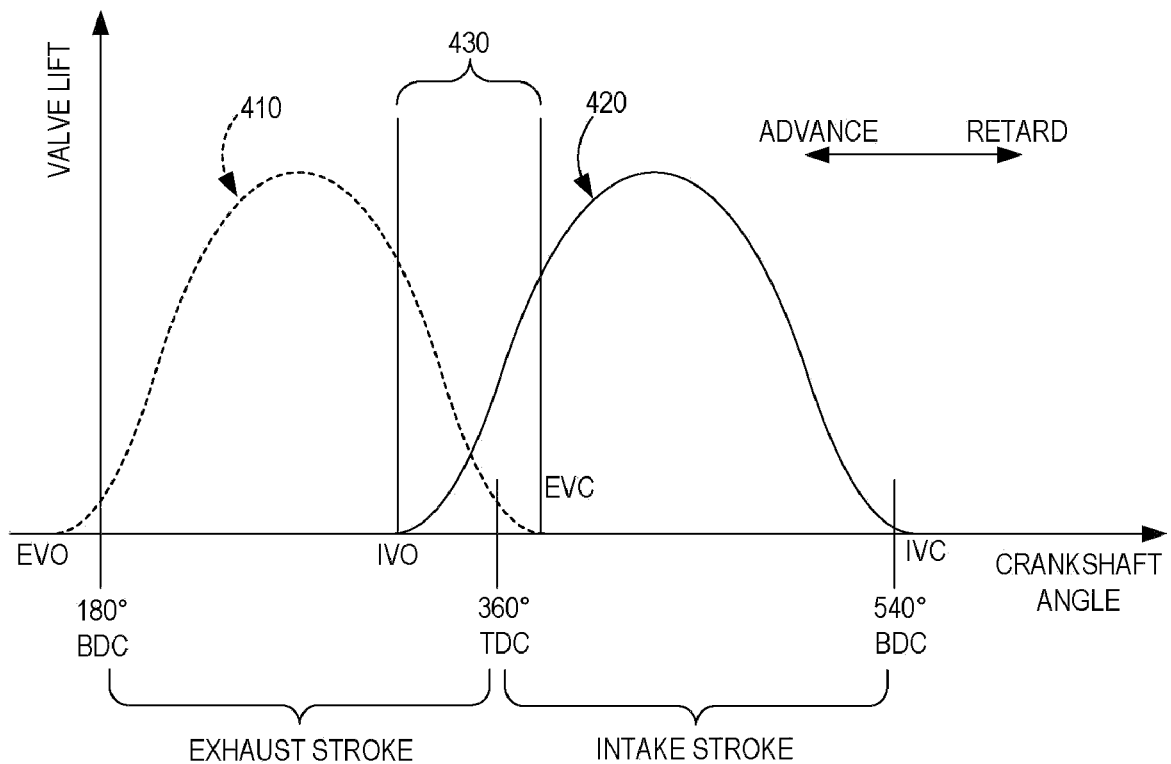
FIG. 4 is a graph showing example valve timings, lifts, and duration during a second operating mode.

FIGS. 3 and 4 are graphs showing example intake valve and exhaust valve operations utilizing the cam profile switching and variable cam timing configurations described above with reference to FIG. 2. In particular, FIGS. 3 and 4 show the position of an intake valve (which may be one of intake valves 212) and an exhaust valve (which may be one of exhaust valves 222), with respect to crankshaft angle. The exhaust stroke of the cycle is shown generally occurring between 180 degrees bottom dead center (BDC) and 360 degrees (TDC) crank angle. Subsequently, the intake stroke of the cycle is shown generally occurring between 360 degrees TDC and 540 degrees BDC crank angle. Valve timing may be considered advanced or retarded relative to TDC or to a nominal valve timing, for example an intake timing occurring between 360 degrees and 540 degrees. Nominal timing may be advanced or retarded from TDC. Thus, "advanced relative to nominal" may result in a valve opening before or after TDC.

Further, as shown in FIGS. 3 and 4, a lift of zero or no lift corresponds to a closed position for a valve, while a positive lift corresponds to the valve being in an open position, thereby enabling air to flow into or out of the combustion chamber. During valve operation, the amount of lift shown during intake strokes and exhaust strokes in FIGS. 3 and 4 may vary widely without departing from the scope of the examples described herein.

FIG. 3 shows the lift provided to an example intake valve and an example exhaust valve during a first operating mode. In the present example, during the first operating mode, both the example intake valve and exhaust valve are opened for long durations, (in comparison to the durations described below in FIG. 4) with at least one long duration cam. In additional examples, only the exhaust valve or only the intake valve is operated with at least one long duration cam during the first operating mode. In some examples, the first operating mode is characterized by an engine load below a part engine load threshold. In additional examples, a first operating mode is characterized by an engine speed above an engine speed threshold. Exhaust lift is shown by dashed line 310, starting with exhaust valve opening (EVO) at approximately 147 crankshaft degrees, and ending at exhaust valve closing (EVC) at approximately 410 crankshaft degrees. Intake valve lift is shown by solid line 320, starting with intake valve opening (IVO) at approximately 380 crankshaft degrees and ending with intake valve closing (IVC) at approximately 628 crankshaft degrees. Both intake and exhaust valves may be open during valve overlap duration 330. The intake valve is open for a first duration of approximately 248 crankshaft degrees and the exhaust valve is open for a first duration of approximately 263 crankshaft degrees.

In further examples, valve timing may be advanced or retarded, for example by a VCT device or VCT system described above. Valve timing may change in response to operating ranges included in the first operating mode. For example, during a fourth operating range defined by an engine speed above an engine speed threshold, intake and exhaust timing may be at nominal timings. Additionally a first operating mode may include a third operating range, defined by an engine load below a low engine load threshold, and a first operating range, defined by an engine load above a low engine load threshold. In some such examples, intake and/or exhaust timing may be advanced as compared to nominal timings during the third operating range and retarded as compared to nominal timings during the first operating range.

Further, a duration of time of intake to exhaust valve overlap (i.e., when both an intake and an exhaust valve of a cylinder are open), such as valve overlap duration 330, may be controlled. During a third operating range, valve overlap may be decreased (e.g., possibly no overlap or negative overlap) and during a first operating range, valve overlap may be increased. In this way, both the intake valve and the exhaust valve may be opened for first durations to give optimized twin independent variable camshaft timing benefits and improved fuel efficiency.

FIG. 4 shows the lift provided to an example intake valve and an example exhaust valve during a second operating mode. In the present example, during the second operating mode, both the example intake valve and exhaust valve are opened for short valve durations, (in comparison to the durations described above in FIG. 3) with at least one short duration cam. In additional examples, only the exhaust valve or only the intake valve is operated with at least one short duration cam during the second operating mode. The second operating mode may be characterized by an engine load above an engine load threshold and an engine speed below an engine speed threshold. Exhaust lift is shown by dashed line 410, starting with EVO at approximately 160 crankshaft degrees and ending at EVC at approximately 380 crankshaft degrees. Intake valve lift is shown by solid line 420, starting with IVO at approximately 320 crankshaft degrees and ending with IVC at approximately 548 crankshaft degrees. Both intake and exhaust valves may be open during valve overlap duration 430. The intake valve is open for a second duration of approximately 228 crankshaft angle degrees and the exhaust valve is open for a second duration of approximately 220.

In some examples valve overlap duration 430 may be longer than valve overlap duration 330 described above in FIG. 3, in order to provide good scavenging and torque when intake pressure is higher than exhaust pressure. Also the exhaust valve may be opened for a second duration, shorter than first duration (as described above in FIG. 3), to prevent an exhaust blowdown pulse of one cylinder from entering another cylinder during valve overlap. Further, the intake valve may be opened for a second duration shorter than the first duration in order to provide good volumetric efficiency and torque.

The second operating mode may also include a second operating range. Exhaust and intake valve timing may be nominal during the second operating range. Exhaust and intake valve timing is advanced relative to the timing shown in FIG. 3 (i.e., exhaust and intake valve timing in FIG. 3 is retarded relative to the timing shown in FIG. 4). In further examples, valve timing advance or retard may differ and may be controlled, for example, by a VCT device or system described above.

Figure 5:
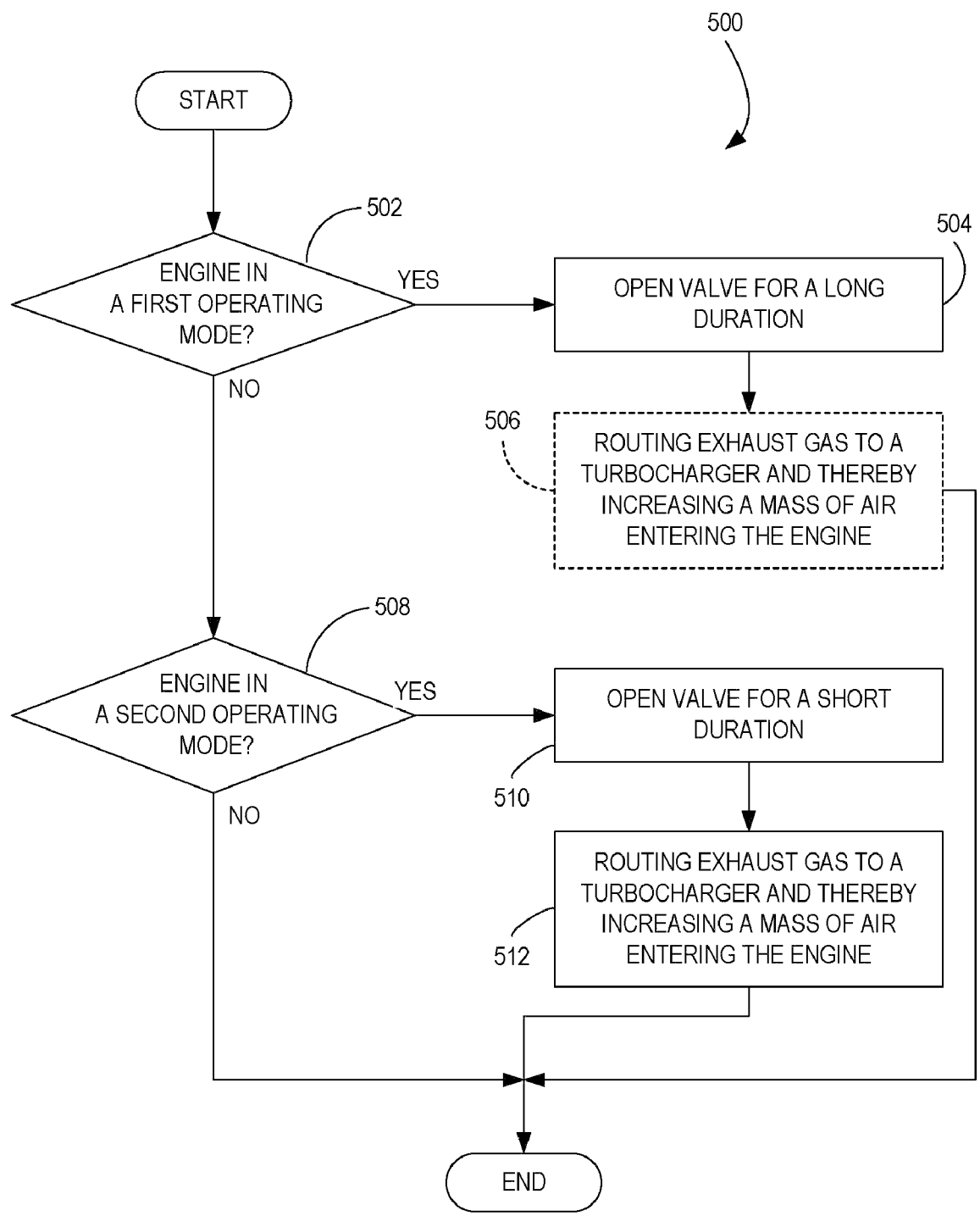
FIG. 5 shows an example method for controlling air flow in an engine.

FIG. 5 shows an example method for controlling an engine, for example engine 200 described above. The method may include controlling air flow by opening and closing at least a first valve (e.g., an intake valve or an exhaust valve) servicing a first cylinder of the engine and operating a boost device (e.g., turbocharger) to increase a mass of air to the cylinder (e.g., one of cylinders 210). The cylinder may be operated by directly injecting fuel into the first cylinder. Further, the method may be included as a routine run in an engine controller, for example controller 202 described above.

At 502, the method begins by determining if the engine is in a first operating mode. A first operating mode may be characterized by the engine having an engine load below an engine load threshold (e.g., a partial engine load or a low engine load). Such engine loads may include the first operating range and the third operating range, as described above with reference to FIG. 3. Additionally, a first operating mode may be characterized by an engine load threshold which is a function of engine speed. Such a first operating mode may include the fourth operating range, as described above with reference to FIG. 3. If it is determined that the engine is in the first operating mode, method 500 moves to 504 to open the first valve for a first duration during the first operating mode. The first duration may be a long duration. Where the first valve is an intake valve, opening the valve for a long duration may reduce fuel consumption via reduced pumping work that improves fuel efficiency. Where the first valve is an intake valve, the first duration may be 248 crankshaft degrees. Where the first valve is an exhaust valve, opening the valve for a long duration may reduce fuel consumption via increased residual dilution and reduced pumping work. Where the first valve is an exhaust valve, the first duration may be 263 crankshaft degrees. A first cam may be used to open the first valve for the first duration. The method may further include steps and processes for switching to operation of the first cam, as described in further detail below with reference to FIG. 7. Further, opening the valve for a long duration may enable optimized variable valve timing (for example, retarding or advancing valve timing with a VCT system, as described below with reference to FIG. 6), further improving engine efficiency.

After 504, the method may continue to 506, routing exhaust gas to a turbocharger and thereby increasing a mass of air entering the engine. A dashed box at 506 indicates that it may be optionally included in example method 500. After 506, the method may end.

Returning to 502, if it is determined that the engine is not in a first operating mode, the method continues to 508 to determine if the engine is in a second operating mode. A second operating mode may be characterized by the engine having an engine load above an engine load threshold and an engine speed below an engine speed threshold (i.e., a high engine load and low to mid engine speed). Such engine speeds and engine loads may include the second operating range, as described above with reference to FIG. 4. In some examples, the engine load threshold of the second operating mode may be the same as the engine load threshold of the first operating mode. In other examples, the engine load threshold of the second operating mode is not the same as the engine load threshold of the first operating mode, and/or the engine load threshold may be a function of engine speed.

During the second operating mode, the engine may open the first valve for a second duration at 510. The second duration may be a short duration (or at least shorter than the long duration) and opening the valve for a short duration may inhibit an exhaust blowdown of the first cylinder from entering a second cylinder as well as improve scavenging and torque. Further, a throttle may be in a fully open or wide open throttle (WOT) position to further improve scavenging and torque. Where the first valve is an intake valve, the second duration may be 228 crankshaft degrees. Where the first valve is an exhaust valve the second duration may be 220 crankshaft degrees. A second cam may be used to open the first valve for the second duration. The method may further include steps and processes for switching to operation of the second cam, as described below in FIG. 7. In other examples, the method may include advancing or retarding valve timing, as described below with reference to FIG. 6, to improve fuel efficiency and increase engine torque over a range of engine speeds.

After 510, the method may continue to 512, routing exhaust gas to a turbocharger and thereby increasing a mass of air entering the engine. Using a turbocharger to increase a mass of air entering the engine during a second operating mode may increase air flow to the engine. After 512, the method may end. Further examples of method 500 may include additional determinations of engine operating mode based, for example, on engine load and engine speed. Additional examples of method 500 may include the use of other air flow control devices and systems, for example a throttle or an EGR device or system.

Figure 6:
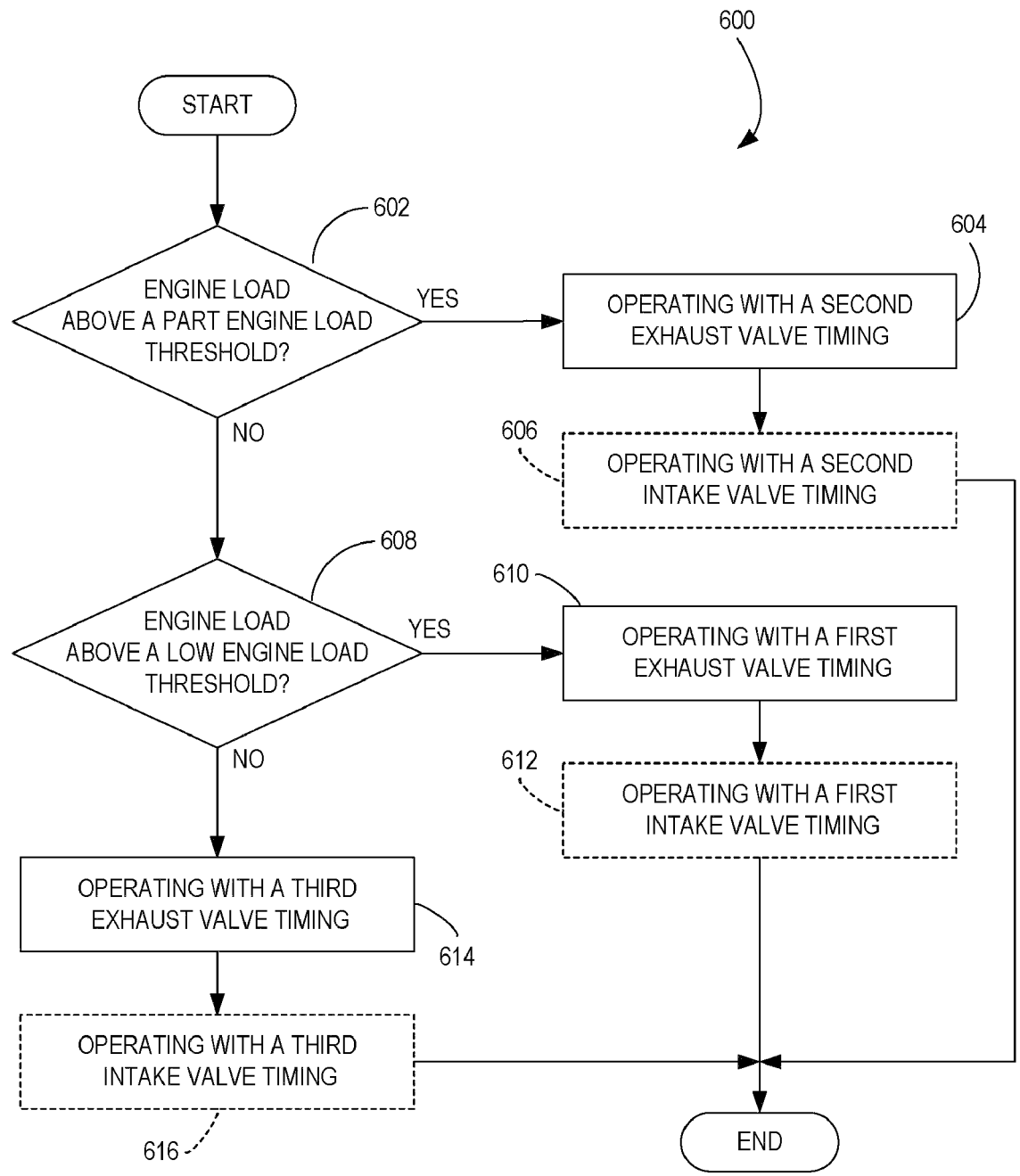
FIG. 6 shows an example method for controlling valve timing in an engine.

FIG. 6 shows an example method 600 for controlling an engine, for example engine 200 described above. The method may include controlling air flow by opening and closing at least a first valve (e.g., an intake valve or an exhaust valve) servicing a first cylinder of the engine. The cylinder may be operated by directly injecting fuel into the first cylinder. The method may include advancing or retarding valve timing, to improve fuel efficiency and increase engine torque over a range of engine speeds. Further, the method may be included as a routine run in an engine controller, for example controller 202 described above.

At 602 the method begins by determining if the engine load is above a part engine load threshold. Engine load may be determined based on throttle position, manifold air pressure, engine speed and the like. If, at 602, the engine load is determined to be above the part engine load threshold, the method continues to 604, to operate with a second exhaust valve timing. An engine with an engine load above the part load threshold may be in either a second or a fourth operating range. The second exhaust valve timing may be a nominal exhaust valve timing. After 604, the method may optionally continue to operate with a second intake valve timing (as indicated by the dashed box at 606), otherwise the method may end. The second intake timing may be a nominal intake valve timing. In some examples, operating with the second exhaust valve timing and/or second intake valve timing may result in a nominal valve overlap. In additional examples, operating with a second exhaust valve timing and/or second intake valve timing may increase valve overlap in comparison to a nominal valve overlap. After completing operation of the engine with the second intake valve timing, the method 600 may end.

Returning to 602, if the method determines that the engine load is not above a part engine load threshold, the method may continue to 608. At 608, the method determines if the engine load is above a low engine load threshold. Engine load may be determined in a manner similar to that described at 602. If the engine load is above a low engine load threshold, the method may continue to 610 to operate the engine with a first exhaust valve timing. An engine with an engine load below a part engine load threshold and above a low engine load threshold may be in a first operating range. The first exhaust valve timing may be retarded in comparison to the nominal exhaust valve timing. After 610, the method may optionally continue to operate with a first intake valve timing (as indicated by the dashed box at 612), otherwise the method may end. The first intake timing may be retarded in comparison to the nominal intake valve timing. In some examples, operating with the first exhaust valve timing and/or first intake valve timing may result in the nominal valve overlap. After completing operation of the engine with the first intake valve timing, the method 600 may end.

Returning to 608, if the method 600 determines that the engine load is not above a low engine load threshold, the method may continue to 614, operating with a third exhaust valve timing. An engine with an engine load below a low engine load threshold may be in a third operating range. A third exhaust valve timing may be advanced in comparison to the nominal exhaust valve timing. After 614, the method may optionally continue to operate with a third intake valve timing (as indicated by the dashed box at 616), otherwise the method may end. A third intake timing may be advanced in comparison to the nominal intake valve timing. In some examples, operating with the third exhaust valve timing and/or third intake valve timing may decrease valve overlap in comparison to the nominal valve overlap. After completing operation of the engine with the third intake valve timing, the method 600 may end.

In some examples, method 500 (as shown in FIG. 5) and method 600 (as shown in FIG. 6) may be combined to operate an engine accordingly. Such examples may include operating the engine in response to engine conditions that define operating ranges. In a first operating range, during part load and low to mid engine speed, an engine may operate with a long exhaust valve opening duration, retarded exhaust valve opening and closing timing, and retarded intake valve opening and closing. In a second operating range, during high load and low to mid engine speed, an engine may operate with short exhaust valve opening duration, advanced exhaust valve opening and closing timing, and advanced intake valve opening and closing. In a third operating range, during low load, an engine may operate with long exhaust valve opening duration, advanced exhaust valve opening and closing timing, and advanced intake valve opening and closing. Finally, in a fourth operating range, during high load and high engine speed, an engine may operate with long exhaust valve opening timing, advanced exhaust valve opening and closing timing, and advanced intake valve opening and closing. Changing engine operation in response to engine operating ranges may produce valve timing, valve durations, and valve overlap such as those shown in the table below.

| Operating range | First | Second | Third | Fourth |
|---|---|---|---|---|
| Engine load | Part load | High load | Low load | High load |
| Engine speed | Any speed | Low to mid speed | Any speed | High speed |
| Exhaust valve duration | Long | Short | Long | Long |
| Exhaust valve timing | Retarded in relation to nominal | Nominal | Advanced in relation to nominal | Nominal |
| Intake valve timing | Retarded in relation to nominal | Nominal | Advanced in relation to nominal | Nominal |
| Valve overlap duration | Nominal | Increased | Decreased | Nominal |

Figure 7:
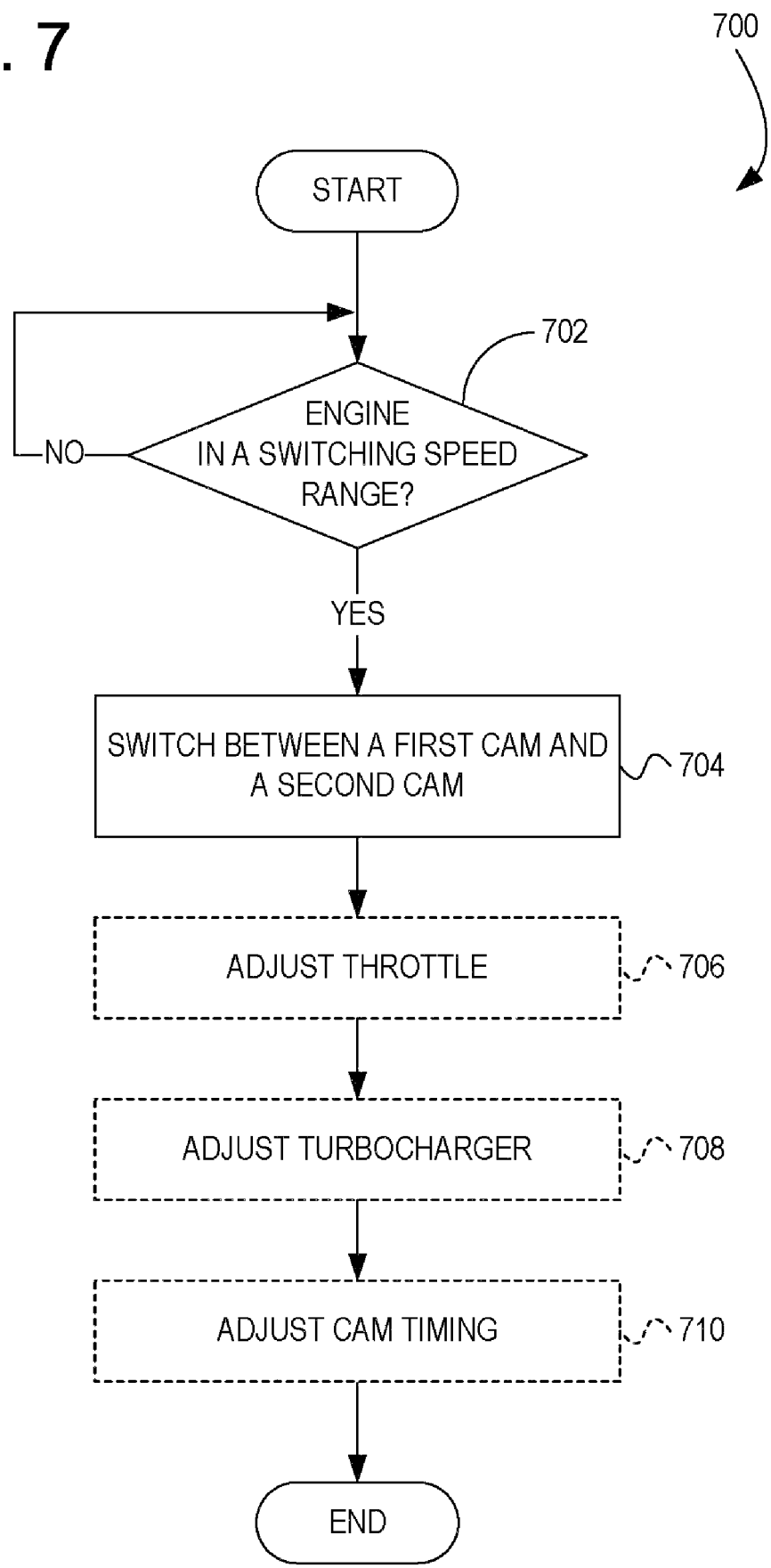
FIG. 7 shows an example method for switching between a first cam and a second cam.

FIG. 7 shows a method 700 to control airflow in cylinders of an engine by switching between a first cam for opening a valve for a first duration and a second cam for opening the valve for a second duration. The method may be carried out by an example CPS system and may further include the use of an example controller, throttle, turbocharger and/or VCT system.

Method 700 begins at 702, with a determination of whether an engine is in a switching speed range. In one example, the switching speed range is 1200 revolutions per minute (rpm) to 3500 rpm. In other examples of method 700, a determination of whether an engine is below or above an engine switching speed may take place, for example, at 4000 rpm. If the engine is not in a switching speed range, the method may repeat 702. If the engine is in a switching speed range, the method may continue to 704 to switch between a first cam and a second cam.

In some examples, switching between a first cam and a second cam may include steps to operate the engine in response to engine operation conditions produced as a result of cam switching. The adjustments in engine operation may be performed in concert with switching between the first cam and the second cam. Such engine operating conditions include differences in transient air flow in different parts of the engine. As such, the method 700 may optionally include adjusting the throttle at 706, adjusting the turbocharger at 708, and/or adjusting the cam timing at 710 (all shown in dashed boxes to indicate their optional nature). Adjusting a turbocharger may include increasing or decreasing a turbocharger speed, and/or adjusting a compressor bypass valve, and/or adjusting a wastegate. Adjusting a throttle may include opening or closing the throttle. Adjusting cam timing may include advancing or retarding valve opening and/or closing. In further examples, other engine operating parameters such as spark timing may be adjusted to compensate for transient air differences and/or improve engine performance during switching. The adjustments in operating parameters may occur before and/or during and/or after cam switching.

Figure 8:
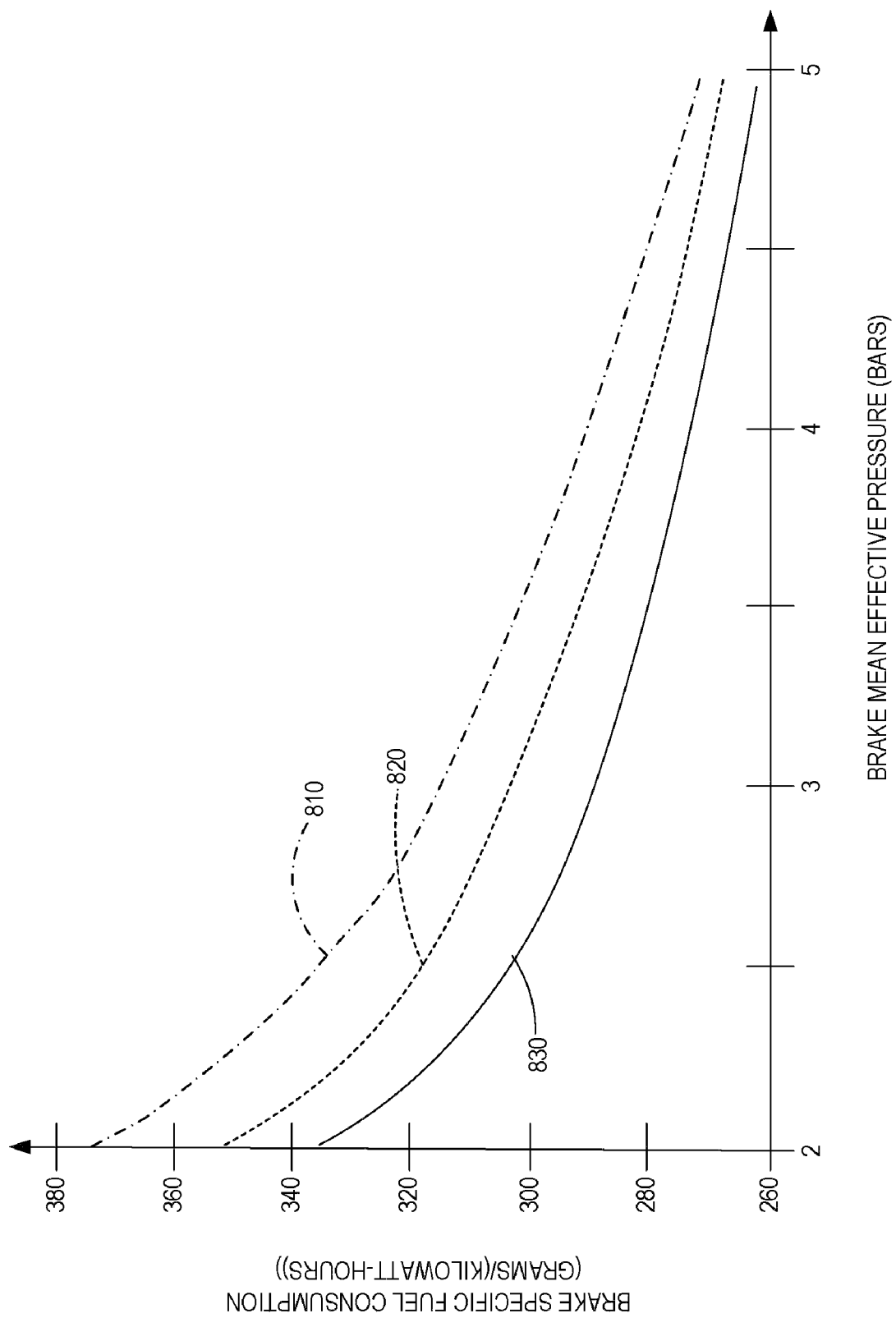
FIG. 8 is a graph of fuel consumption in example engines over a range of engine loads.

FIG. 8 shows a graph of brake specific fuel consumption in example engines over a range of brake mean effective pressures. Fuel consumption may be inversely proportional to fuel efficiency. Engine mean effective pressure may be correlated with engine load. The engines may all be 1.6 liter spray guided direct injection engines run at a stoichiometric air to fuel ratio of approximately 14.3:1 and with maximum brake torque spark timing.

Solid line 830 may represent an engine with a long intake valve duration of 248 crankshaft degrees and a long exhaust valve duration of 263 crankshaft degrees, operating with retarding valve opening and closing events (as shown in FIG. 3). Dash line 820 may represent an engine with a short intake duration of 228 crankshaft degrees and a short exhaust duration of 220 crankshaft degrees (as shown in FIG. 4). Further, the engine of dash line 820 represents an engine using an EGR system providing up to 15% EGR to the engine. Dash-dot line 810 may represent an engine without an EGR system, with a short intake duration of 228 crankshaft degrees and a short exhaust duration of 220 crankshaft degrees (as shown in FIG. 4). At part load, line 830 shows lower (better) fuel consumption than lines 820 and 810, because long cam durations and retarded timing give the lowest pumping work and the highest residual dilution. At part load, line 810 shows the highest (worst) fuel consumption, because short cam durations and lack of EGR give the highest pumping work and the lowest residual dilution. However, at high loads near wide-open throttle (not shown in FIG. 8), where maximum torque is more important than fuel consumption, an engine with short intake and exhaust durations can be operated with high valve overlap to achieve good scavenging and improved torque.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine, comprising:
   a first cylinder;
   an intake valve actuatable between an open position allowing intake air into the first cylinder and a closed position substantially blocking intake air from the first cylinder;
   a first intake cam having a first profile for opening the intake valve for a first intake duration;
   a second intake cam having a second profile for opening the intake valve for a second intake duration shorter than the first intake duration;
   an exhaust valve actuatable between an open position allowing exhaust gases out of the first cylinder and a closed position substantially retaining gases within the first cylinder;
   a first exhaust cam having a first profile for opening the exhaust valve for a first exhaust duration;
   a second exhaust cam having a second profile for opening the exhaust valve for a second exhaust duration shorter than the first exhaust duration;
   a turbocharger in fluid communication with the first cylinder and adjustable to increase a mass of air entering the first cylinder;
   a variable camshaft timing system adjustable to retard timing of at least the exhaust valve during a part engine load; and
   a controller including code to:
      actuate the intake valve via the first intake cam and actuate the exhaust valve via the first exhaust cam at a first engine load; and
      actuate the intake valve via the second intake cam and actuate the exhaust valve via the second exhaust cam at a second engine load and at a first engine speed, the second engine load higher than the first engine load.

2. The engine of claim 1, wherein only a single exhaust passage substantially connects an entire path from an exhaust manifold to a turbine included in the turbocharger.

3. The engine of claim 1, further comprising additional code to:
   at the first engine load, operate with exhaust valve opening and closing timing retarded from nominal exhaust valve opening and closing timing, and intake valve opening and closing timing retarded from nominal intake valve opening and closing timing; and
   at the second engine load, operate with exhaust valve opening and closing timing advanced from nominal exhaust valve opening and closing timing, and intake valve opening and closing timing advanced from nominal intake valve opening and closing timing.

4. The engine of claim 1, further comprising additional code to do at least one of increasing turbocharger speed, decreasing turbocharger speed, closing a throttle, opening a throttle, advancing cam timing and retarding cam timing, in concert with switching between said first exhaust cam and said second exhaust cam.

5. The engine of claim 1, wherein said variable camshaft timing system is a twin independent variable camshaft timing system.

6. The engine of claim 1, wherein said engine is a direct injection engine.

7. The engine of claim 1, wherein said engine is a gasoline engine.

* * * * *